(12) United States Patent  (10) Patent No.: US 8,511,336 B1
Schumacher  (45) Date of Patent: Aug. 20, 2013

(54) IRRIGATION MANIFOLD AND VAULT

(76) Inventor: Scott Michael Schumacher, Sparks, NV (US)

( * ) Notice: Subject to any disclaimer, the term of this patent is extended or adjusted under 35 U.S.C. 154(b) by 693 days.

(21) Appl. No.: 12/462,981

(22) Filed: Aug. 12, 2009

Related U.S. Application Data

(63) Continuation-in-part of application No. 11/752,763, filed on May 23, 2007, now abandoned.

(60) Provisional application No. 60/803,005, filed on May 23, 2006.

(51) Int. Cl.
*F16L 5/00* (2006.01)

(52) U.S. Cl.
USPC ........... 137/382; 137/343; 137/363; 137/364; 137/371; 137/377

(58) Field of Classification Search
USPC ................. 137/343, 363, 364, 371, 372, 377, 137/382, 624.11, 883; 220/484; 251/129.04; 405/36, 38, 39; 239/67, 70
See application file for complete search history.

(56) References Cited

U.S. PATENT DOCUMENTS

| | | | | |
|---|---|---|---|---|
| 1,213,478 A * | 1/1917 | Haase | ............................. | 220/3.8 |
| 3,490,637 A * | 1/1970 | Pope | ............................. | 220/3.4 |
| 4,023,585 A * | 5/1977 | VandenBurg | ................... | 137/80 |
| 4,834,143 A * | 5/1989 | Bayat | ............................. | 137/899 |
| 6,035,887 A * | 3/2000 | Cato | ............................. | 137/364 |
| 6,264,056 B1 * | 7/2001 | King | ............................. | 220/484 |
| 6,491,062 B1 * | 12/2002 | Croft | ........................ | 137/624.11 |
| 6,834,662 B1 * | 12/2004 | Olson et al. | ................ | 137/15.18 |
| 7,004,677 B1 * | 2/2006 | Ericksen et al. | ................ | 405/51 |
| 2005/0199842 A1 * | 9/2005 | Parsons et al. | ........... | 251/129.04 |

\* cited by examiner

*Primary Examiner* — John Fox
*Assistant Examiner* — Kevin Murphy
(74) *Attorney, Agent, or Firm* — Long & Chybik; John D. Long, Esq.

(57) ABSTRACT

An irrigation valve vault including a base frame member having a plurality of sides forming an enclosed area including a first side having a water inlet passage with a plurality of apertures along its length and opening into the enclosed area, a second side having a plurality of apertures extending from the enclosed area to connection points for water lines located on the outside of the second side, a plurality of valves located within the enclosed area and connecting between apertures on the first side and apertures on the second side, a sloped compartment located on top of the base frame, and a lid placed on the top aperture of the sloped compartment.

21 Claims, 10 Drawing Sheets

IRRIGATION MANIFOLD AND VAULT

CROSS REFERENCE TO RELATED APPLICATIONS

The present application is a continuation in part of patent application Ser. No. 11/752, 763, filed May 23, 2007 now abandoned, incorporated by reference herein in its entirety, and which claims the benefit of U.S. Provisional Patent Application Ser. No. 60/803,005, filed May 23, 2006, also incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to irrigation system apparatus, and more particularly to irrigation system valve manifolds, and still more particularly to an irrigation system valve manifold enclosure for subsurface installation and protection of an electronically-powered irrigation system valve manifold.

BACKGROUND INFORMATION AND DISCUSSION OF RELATED ART

Irrigation system pipes are customarily buried below ground in order to protect the pipes from mechanical and weather related damage, to clear space for the free movement of foot and vehicular traffic, and eliminate unsightly apparatus from otherwise aesthetic environments. Valves and valve manifolds commonly employed to control automatic irrigation systems are also frequently buried, generally for the same reasons. The preferred method of burying an irrigation valve manifolds entails providing an enclosure or box for placement in a hole, wholly or partially burying the enclosure, constructing the manifold within the enclosure and connecting it to pipes running to the irrigation areas, and coupling the manifold to a water supply line with a union. In most residential applications, the valve box is left with a portion above ground level, to provide easier access. An electronic valve controller is installed, typically on or in a nearby structure, with leads to each valve passing through a hole into the enclosure interior.

Irrigation system valve manifold boxes are known in the art. The industry leader by a considerable margin is Rain Bird Corporation of Azusa/Glendora, Calif. Valve boxes manufactured by this company typically include a rigid rectangular enclosure for valve system components manufactured from foam high density polyethylene (HDPE) resin, knock-outs for running pipes and wires into the box interior, and a removable lid. Some models provide connection structure to facilitate mounting one box atop another valve box for deep installations. However, none of the Rain Bird brand boxes includes structure for pre-mounting a valve manifold and/or valve manifold pipe assembly, which must be constructed and installed independently and then fit into the box.

Most of the known valve boxes provide insufficient protection of the valve assembly from water intrusion, insects, migrating soils, and so on. Additionally, the valve manifold assemblies generally remain unsupported within the enclosure, and special apparatus or connectors must therefore be installed on the valve box or other structure provided in order to secure, stabilize, and protect the assembly from movement and damage.

A few solutions to the foregoing problems have been proposed and are known. These include, as examples, U.S. Pat. No. 3,984,023, to Hodas, which shows a plastic cuboid underground valve box including separate side and end walls that include interlocking portions adjacent their edges that secure them to each other during assembly of the box. The bottom side of the box is open to permit positioning of the box over one or more underground valves. A plastic cover is pivoted to the box so as to control access to the valve or valves within the box. The box may be divided into one or more compartments that each receive an associated valve.

U.S. Pat. No. 4,976,366, to Russell, shows an underground valve box having a tubular base divided into upper and lower portions by a horizontal member. Concentric steps descend downwardly and inwardly from the horizontal member into the lower portion of the base forming a series of seats, decreasing in diameter and increasing in depth, one of which will accommodate the selected valve body. The upper portion of the base has a pair of accessible diametrically opposed notches in which the inlet and outlet lines of the valve will be disposed when the valve body is inserted in its appropriate seat. The valve box also includes a tubular body which has a pair of accessible notches which can be aligned with the accessible notches of the tubular base. The tubular body is configured to securely removably gird the upper portion of the tubular base with the inlet and outlet lines of the valve disposed in the bottomwardly accessible notches. Preferably, the tubular body is contoured to also restrictively receive the body of the valve so as to minimize the possibility of rotation of the valve within the box.

U.S. Pat. No. 4,872,575, to Kobilan, teaches a protective housing for underground devices, including valves. It includes a base assembly with an open bottom and open top which may be closed with a snap-fit lid, but constructed for stackable arrangement of a plurality of housing structures. The sidewalls and endwalls are constructed to facilitate incisions, slots, and removable flap.

The foregoing patents and prior art devices reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention provides an irrigation system valve manifold vault for subsurface installation and maintenance. The inventive apparatus provides a secure enclosure to prevent migration of the vault within and along the ground and that protects irrigation valves and valve components from water, contamination by dirt and debris, chemical damage from soils, insect infestation, and damage from impact and weather. In a first preferred embodiment, the inventive apparatus comprises a generally rectangular support base containing an inlet pipe section and a plurality of pipe outlets, a vault truncated, four-side pyramidal vault enclosure mounted on the support base, an openable lid removably attached to the top of the vault enclosure for access to the interior in which a valve manifold is contained, and numerous electrical devices that operate in conjunction with the valve manifold of the present invention.

In most instances, the above-described apparatus is installed essentially below ground level, such that the top surface of the support base is essentially at grade or ground level.

Accordingly, it is a first and principal object of the present invention to provide a novel irrigation system valve manifold cover that encloses a valve assembly in an easily accessible vault.

Yet another object of the present invention is to provide an irrigation system valve manifold cover that protects irrigation system valves from water intrusion, insects, and migrating soils.

Still another object is to provide a valve manifold assembly base and vault combination that secures, stabilizes, and protects the valve assembly from movement and damage from impact.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
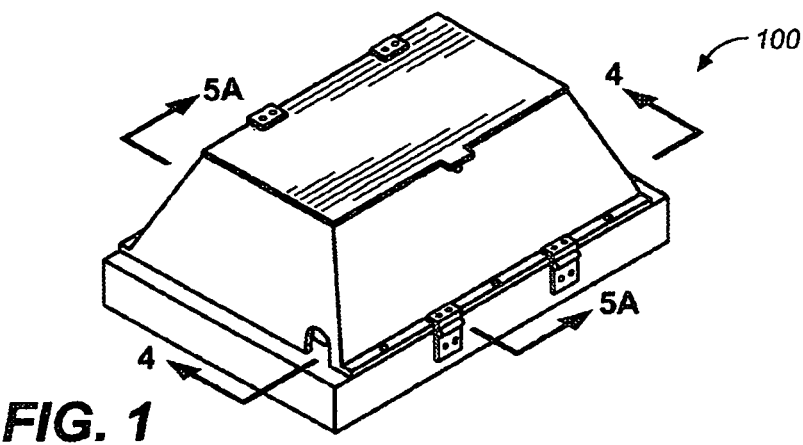
FIG. 1 is an upper left perspective view showing the irrigation system manifold vault of the present invention.
Figure 2:
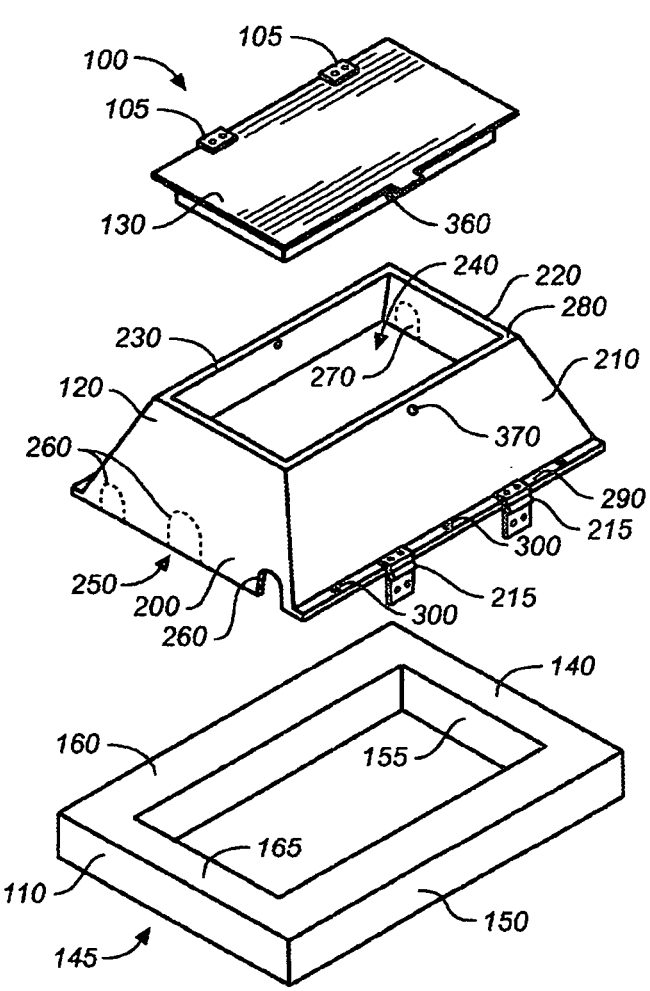
FIG. 2 is an exploded upper left perspective view showing the structural elements of the irrigation system valve manifold vault of FIG. 1.
Figure 3:
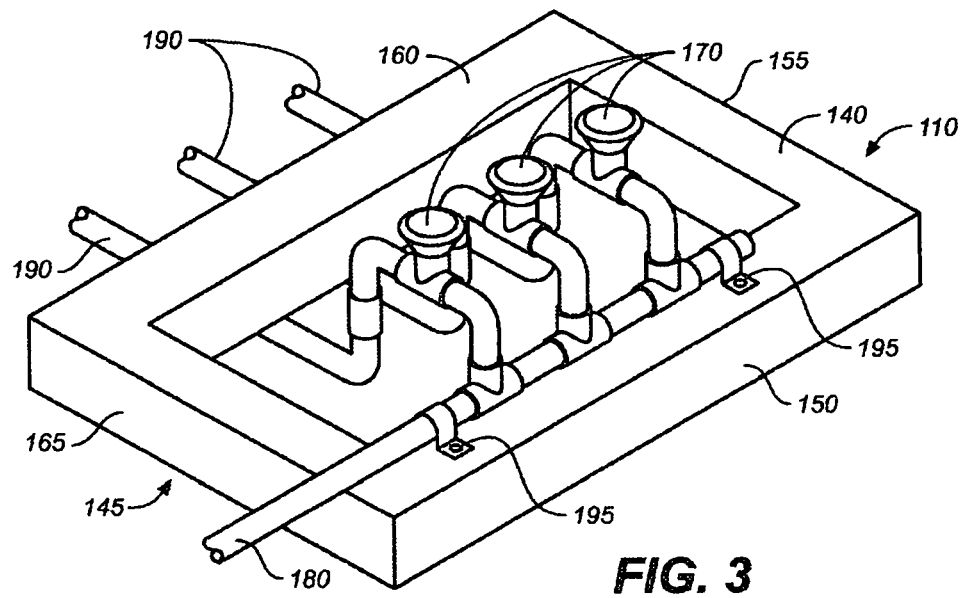
FIG. 3 is an upper left perspective view showing a valve manifold installed and mounted on the base portion of the valve manifold vault, shown without the vault top enclosure.
Figure 4:
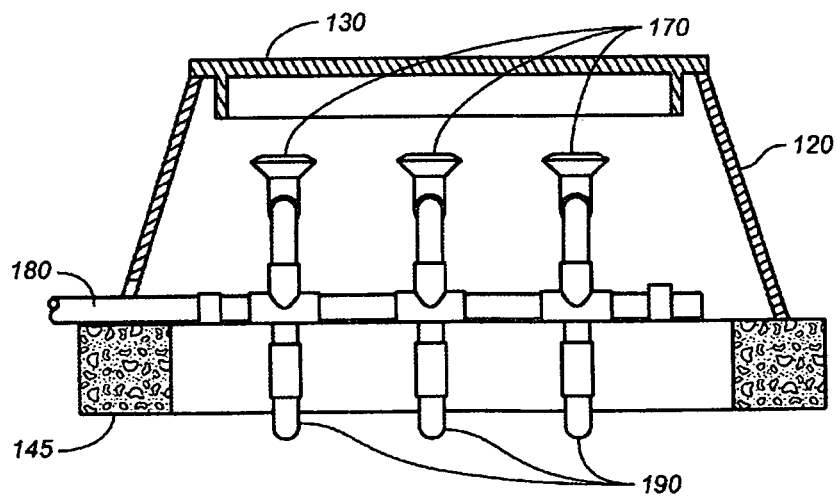
FIG. 4 is a cross-sectional front side view in elevation showing a valve manifold and valves mounted on the base portion and covered with the vault top enclosure.
Figure 5A:
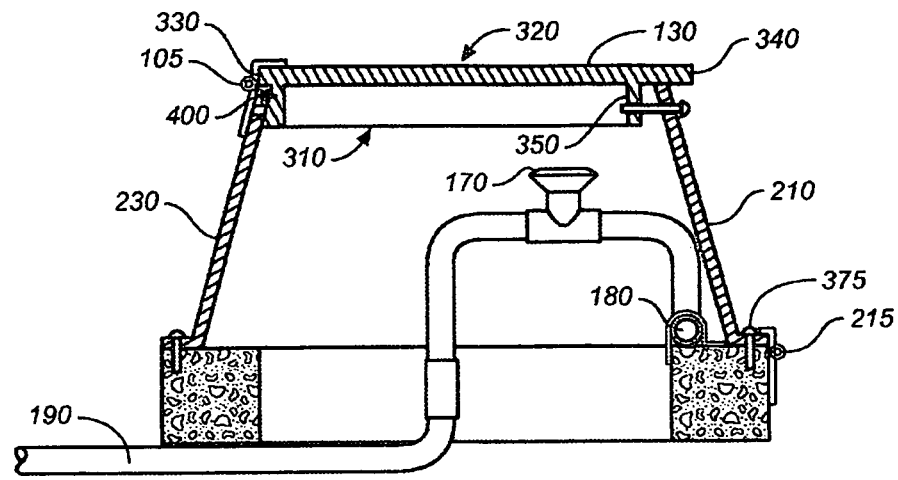
FIG. 5A is a cross-sectional left end view in elevation shown along section line 5A of FIG. 1 showing the vault top enclosure lid closed and bolted shut.
Figure 5B:
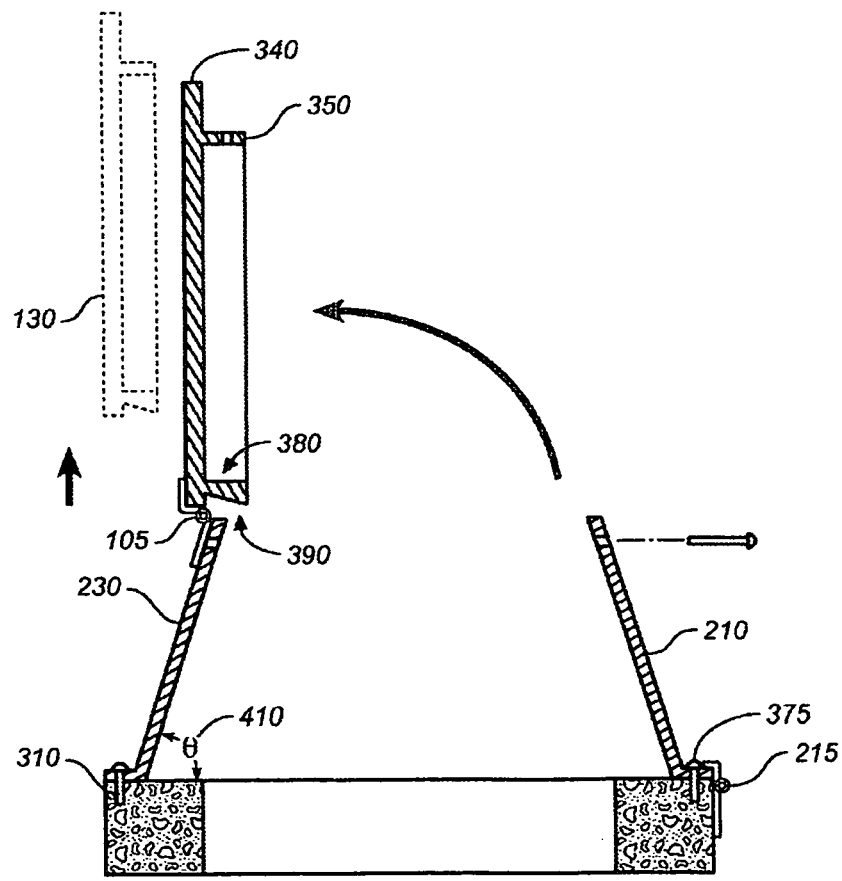
FIG. 5B is a cross-sectional end view in elevation showing the vault top enclosure with the lid open and the valve assembly removed.

Referring to FIGS. 1 through 5B, wherein like reference numerals refer to like components in the various views, there is illustrated therein a new and improved irrigation system valve manifold vault, generally denominated 100 herein. These views, collectively, show that the inventive apparatus comprises three primary portions, including a support base 110, a vault enclosure 120, and a lid 130.

The support frame, or support base, 110 is generally configured in a solid rectangular frame conformation and has sufficient mass to support and secure valve manifolds of the kind typically installed in underground enclosures. It includes four frame members, including a front side 150, a right side 155, a back side 160, and a left side 165. The front, rear, right and left sides are joined to form a contiguous and substantially co-planar top side 140 and a contiguous and co-planar bottom side 145.

A plurality of valves 170 may then be configured into a valve manifold assembly with conventional connectors, elbows, Ts, and the like, in which the valve is connected to a water supply pipe 180 in the inlet end of the valve and to a plurality of corresponding irrigation pipes at the outlet end of the valve. The assembly can then be mounted onto the top side 140 of the base 110 using pipe U-brackets 195, in a well known manner. It will be appreciated that the material from which the support base is made is sufficiently dense for the effective use of screws as fasteners, though bolts could be employed when the base is fabricated from lightweight and less sturdy materials. Additionally, it will be appreciated that the water supply pipe could enter the enclosure from underneath the support base, or even through a side of the support base (there being a through hole provided for such an insertion), and the supply could also be mounted to an interior side of the base, rather than to the top side. However, such a configuration does not alter the fundamental structural and operational characteristics of the present invention.

The vault enclosure 120 is shaped as a truncated, four-sided pyramid and comprises a left side 200, a front side 210, a right side 220, and a back side 230. The sides are joined at their respective edges to adjoining sides and angle inwardly toward their upper portions to form an open top 240, which functions as an access to valve components. The bottom 250 is also open. Knockouts, 260 and 270, are included on each of the left and right sides, respectively, to provide means to insert inlet pipes through a selected side. The sides terminate at their upper portions in an upper edge 280, which provides a seat for lid 130.

The bottom portion of the front and back sides, includes a flange 290 having a plurality of holes 300 for securing the vault enclosure proximate the perimeter of the base with fasteners 305 onto the top side of the support base. Alternatively, the vault enclosure may be pivotally attached to one side of the support base with hinges 215, and then attached to the other side of the support base with permanent fasteners or selectively releasable fasteners, such as cotter pins, clevis pins, or simply a conventional latch. The angle 410 between the front and back sides of the vault enclosure and the top side of the support base can be adjusted for the typical commercial and residential installations such that there is sufficient clearance between the interior walls of the vault enclosure and the valve body to prevent any bending or twisting applied to the enclosed conduits or pressure applied to the valve body.

The lid 130 includes an underside 310 and a top side 320, a back edge 330 and a front edge 340. A downwardly projecting skirt extends substantially around the underside of the lid, though it is spaced apart from the edge of the underside such that it fits within the opening in the vault. The front side 350 of the skirt includes a through hole 360 that may be aligned with a through hole 370 in the front side of the vault enclosure for securing with a pin 375.

The back side 380 of the skirt includes an angled side 400 that matches the angle of the interior side of the back side 230 of the vault enclosure. This secures the lid snugly onto the top of the vault enclosure while facilitating easy removal for adjustment, replacement, and repair of the valves. Alternatively, the lid may be pivotally attached to the vault enclosure by hinges 105 and secured in its shut position with pin 375, as described above.

As will be appreciated, a fundamental objective achieved by the lid and vault enclosure assembly is to provide rapid access to a clean and well-preserved valve manifold. Underground valve manifolds are notoriously dirty, rusted, bug and spider infested, and frequently submerged under ground water. The lid and vault enclosure combination described herein overcomes these problems by protectively covering a manifold secured on a buried support with a sarcophagus-like structure that extends above ground and above low levels of vegetation or snow. When placed on crushed rock or pea gravel, the support prevents a measure of water intrusion and further prevents infestation by spiders or other insects.

From the foregoing description, it will be clear that in its most essential aspect, the present invention is an irrigation system valve manifold vault which includes, at a minimum: a support base, a vault enclosure mounted on the support base, wherein the vault enclosure is a truncated four-sided pyramid having an open top, an open bottom, and four sides; an openable lid which selectively covers the open top of the vault enclosure and providing selective access to the interior of said enclosure; and bracket or other structural means for attaching an irrigation valve manifold assembly onto the support base.

While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Figure 6:
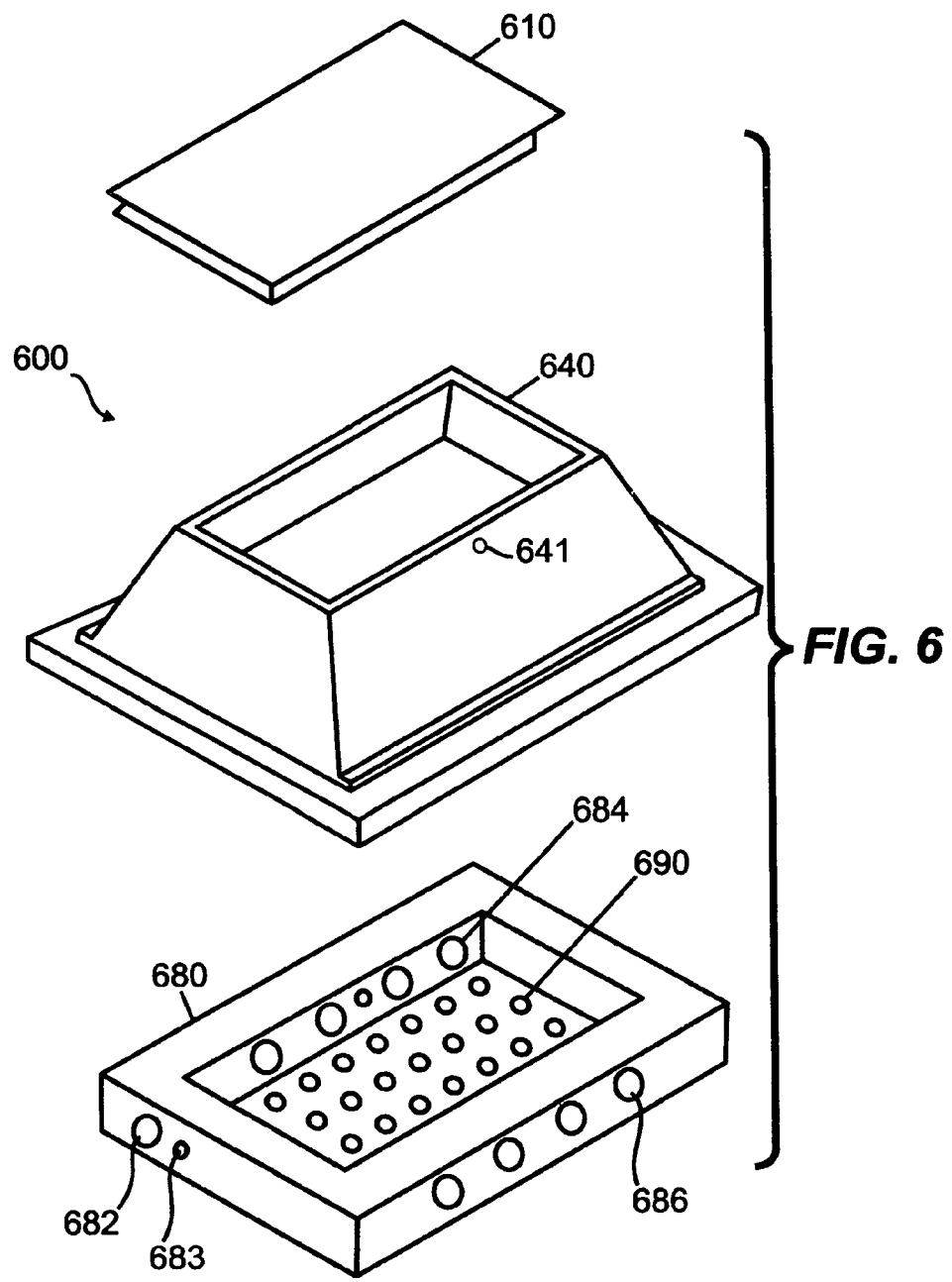
FIG. 6 is an exploded view of an alternative embodiment of the present invention.

Directing attention to FIG. 6, in an alternative embodiment similar to vault 100 described above, vault 600 includes lid 610, compartment 640, and base frame 680. Compartment 640 is a sloped, multi-sided structure that sits atop base frame 680 and has side walls that converge to define an area at the top that is covered by lid 610. In an embodiment, compartment 640 includes lid lock 641. It is contemplated by the inventor that compartment 640 and base frame 680 are installed below ground level, with lid 610 placed at or near ground level.

Figure 7A:
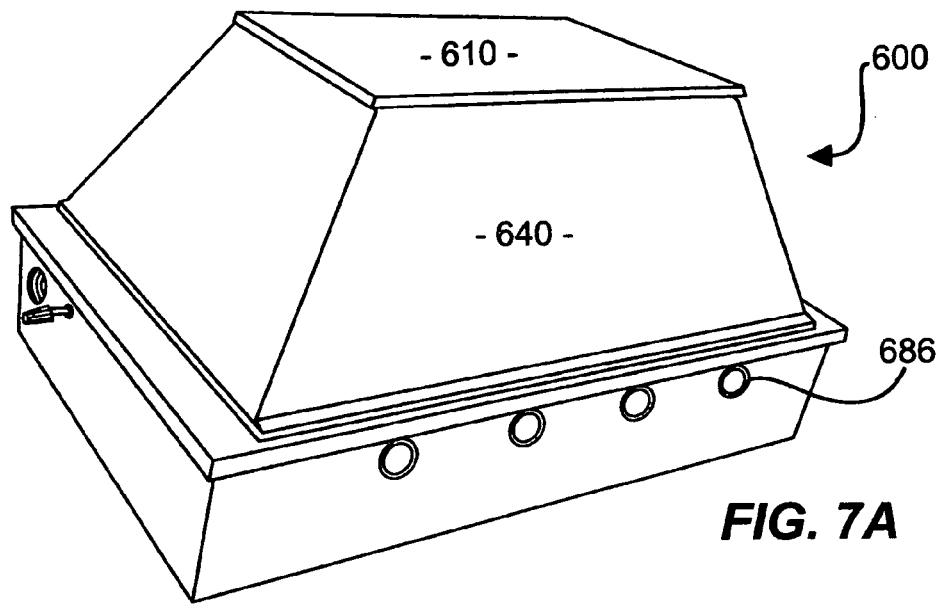
FIGS. 7A and 7B are perspective elevation views of an alternative embodiment of the present invention.
Figure 7B:
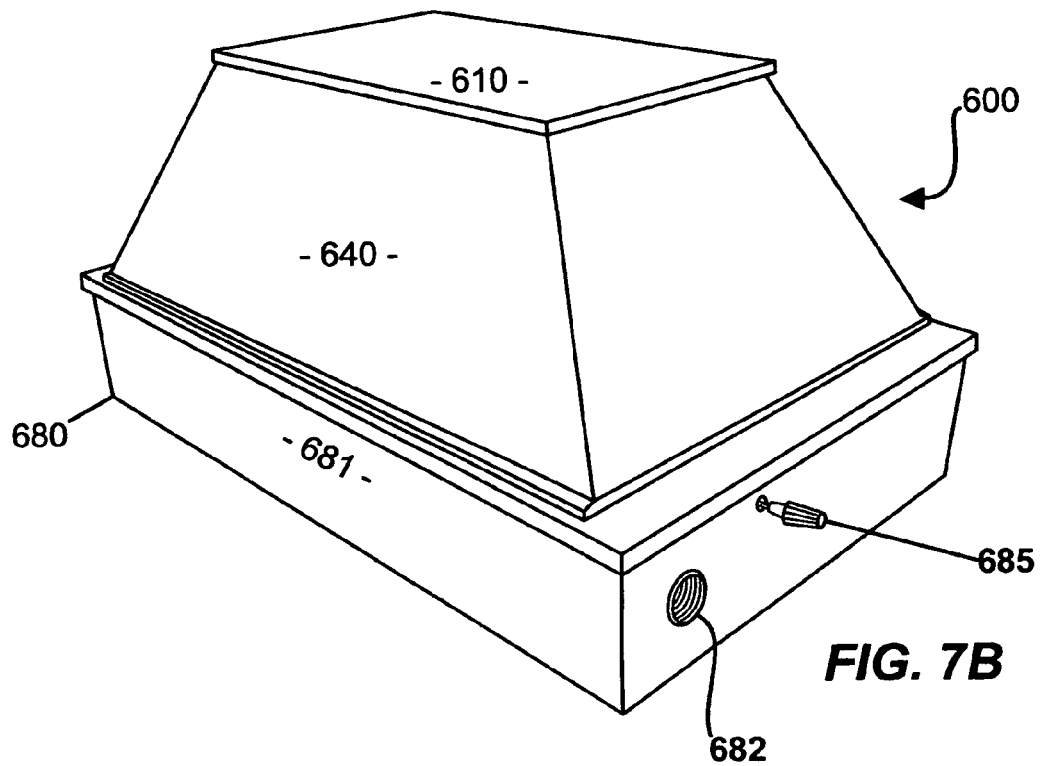

Base frame 680 includes water inlet 682, an elongated water passage that feeds water through a plurality of inlet apertures 684 on the interior face of back side 681 (FIG. 7A) of base frame 680. Wire access aperture 683 is located proximate to water inlet 682, to provide a passage for wiring 685 (FIG. 7B) that connects to valves placed between inlet apertures 684 and outlet apertures 686. Outlet apertures 686 serve as connection points for individual irrigation lines. Returning to FIG. 6, optional grate 690 can be configured on the bottom of base frame 680.

Figure 8:
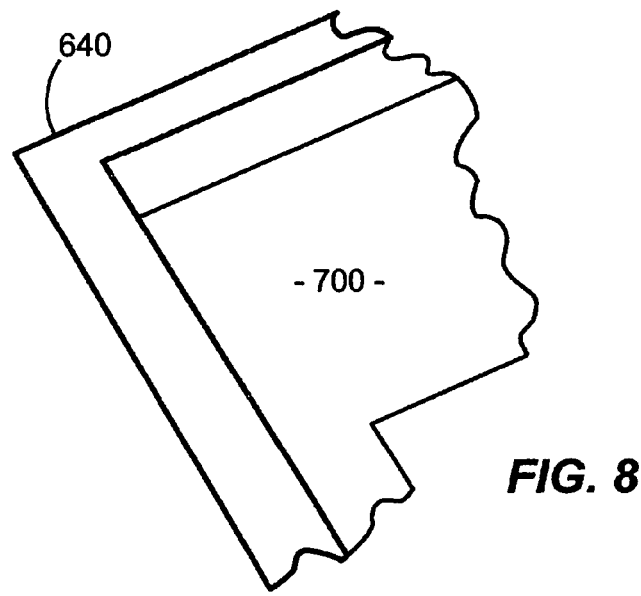
FIG. 8 is a view of the underside of the central compartment of the alternative embodiment of the present invention.

It is contemplated that installation of vault 600 is performed in a piecewise fashion. First, base frame 680 is placed at the bottom of a hole in a desired location. Compartment 640, having a recessed interior surface 700 (FIG. 8) that forms a lip sufficiently dimensioned to span the edges of base frame 680. This allows compartment 640 to fit snugly on base frame 680 during installation.

Figure 9:
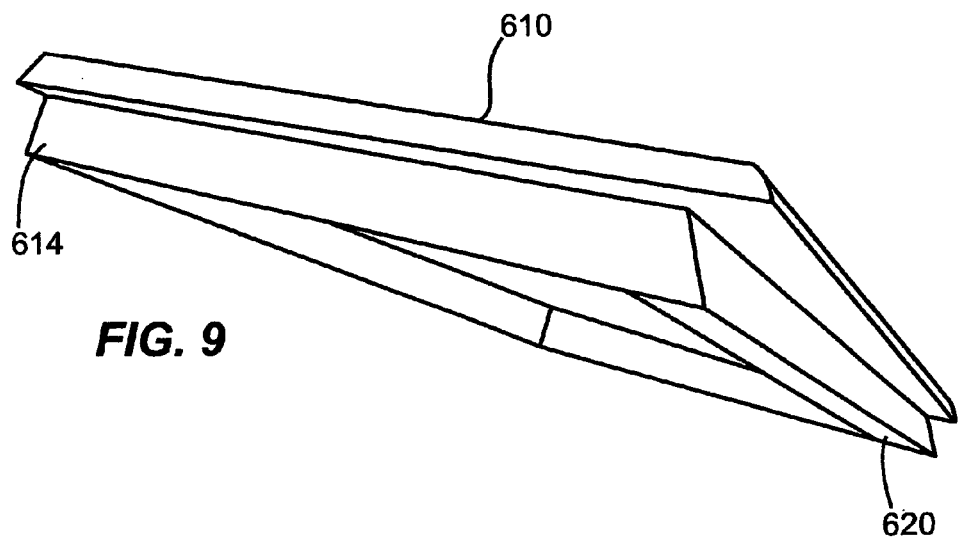
FIG. 9 is a perspective view of the lid that covers the alternative embodiment of the present invention.

As shown in FIG. 9, in an embodiment, lid 610 has an underframe 614 that has a sloped profile on its rear edge 620. This rear edge 620 functions as a hinge to allow lid 610 to rotate backward while still placed upon compartment 640.

Figure 10:
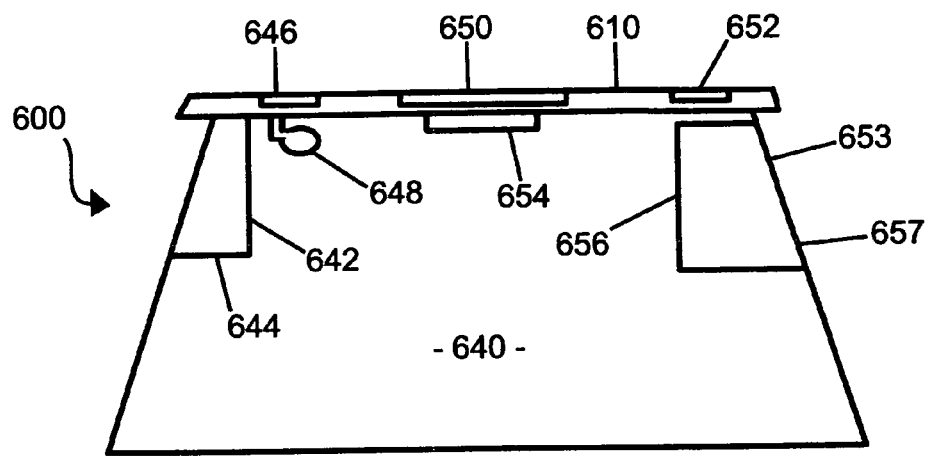
FIG. 10 is an elevation view of the central compartment and lid of the present invention, showing functional elements incorporated into alternative embodiments of the present invention.

Directing attention to FIG. 10, compartment 640 provides a convenient space in which numerous electronic and mechanical enhancements to a conventional irrigation valve manifold can be stored. For example, on the left side of compartment 640, battery 642 can be included to power devices located within vault 600. Communication module 644, such as a radio receiver or telecommunication receiver, for use with remote control of irrigation valves inside vault 600. Communication module 644 can also include a transmitter for reporting functions and malfunctions occurring within vault 600. Thermometer 646 can be located on lid 610, to provide temperature information that is used to control operation of irrigation valves located within vault 600. Light bulb 648 can be located underneath lid 610, or lower, such as on an interior wall of compartment 640 or even on an interior wall 640, to provide illumination as well as to prevent valves from freezing during cold conditions. Solar panel 650 can be located on lid 610 to charge batter 642. Solar panel 650 can also be located on a telescoping pole that elevates solar panel above lid 610 or positions solar panel 650 to an optimal azimuth or elevation for charging battery 642. Moisture sensor 652 can also be located on lid 610, and is useful for maintaining irrigation valves in a closed position during rain to prevent overwatering. LED display 653 can be located at the top of a sidewall of compartment 640 in instances where compartment 640 protrudes above ground level. Alternatively, LED display 653 can be located on lid 610. Vent 654 can be located at the top of one or more sidewalls of compartment 640. Irrigation controller 656 and clock 657 can also be mounted on an interior wall of compartment 640. While in the preferred embodiment, vault 600 is located beneath ground level, above-ground installations are also contemplated. In such embodiments, if freezing pipes are a concern, an electrical heating element can be incorporated within vault 600, for example, a heating coil located around the inner circumference of compartment 640 or base frame 680, or at locations on grate 690, or other suitable configurations that keep the temperature within vault 600 above freezing.

Figure 11:
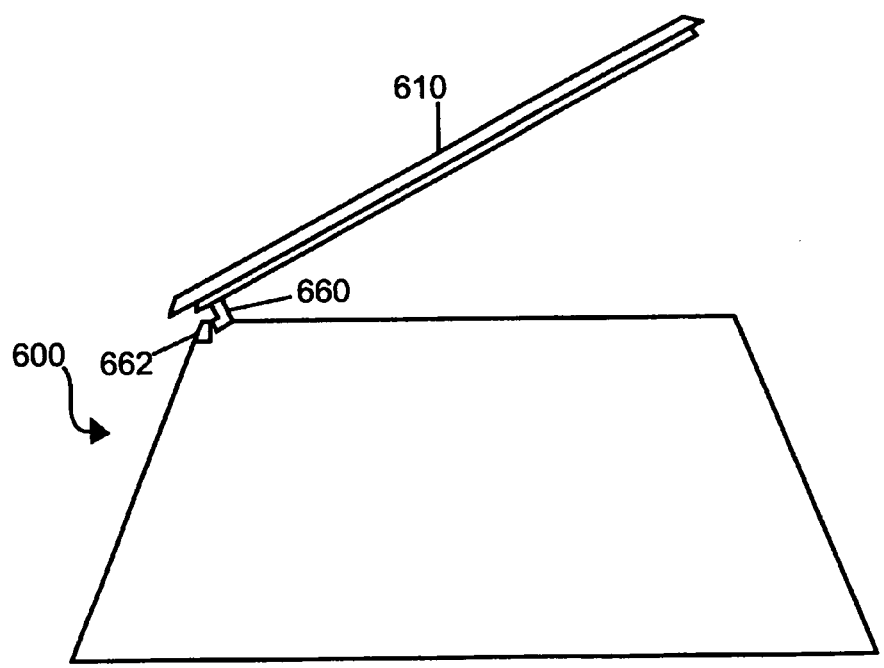
FIG. 11 is an elevation view showing an electrical connection between the central compartment and lid of the present invention.

Directing attention to FIG. 11, lid 610 can incorporate electrical contact 660 that, when lid 610 is in a closed position, is brought into contact with electrical contact 662, to provide connection between solar panel 650 and battery 642.

All of the devices described above take advantage of the open space provided by compartment 640, and mounting them near the top of compartment 640 provides easy access by reaching down through the opening beneath lid 610, and manipulating the devices from underneath.

Figure 12:
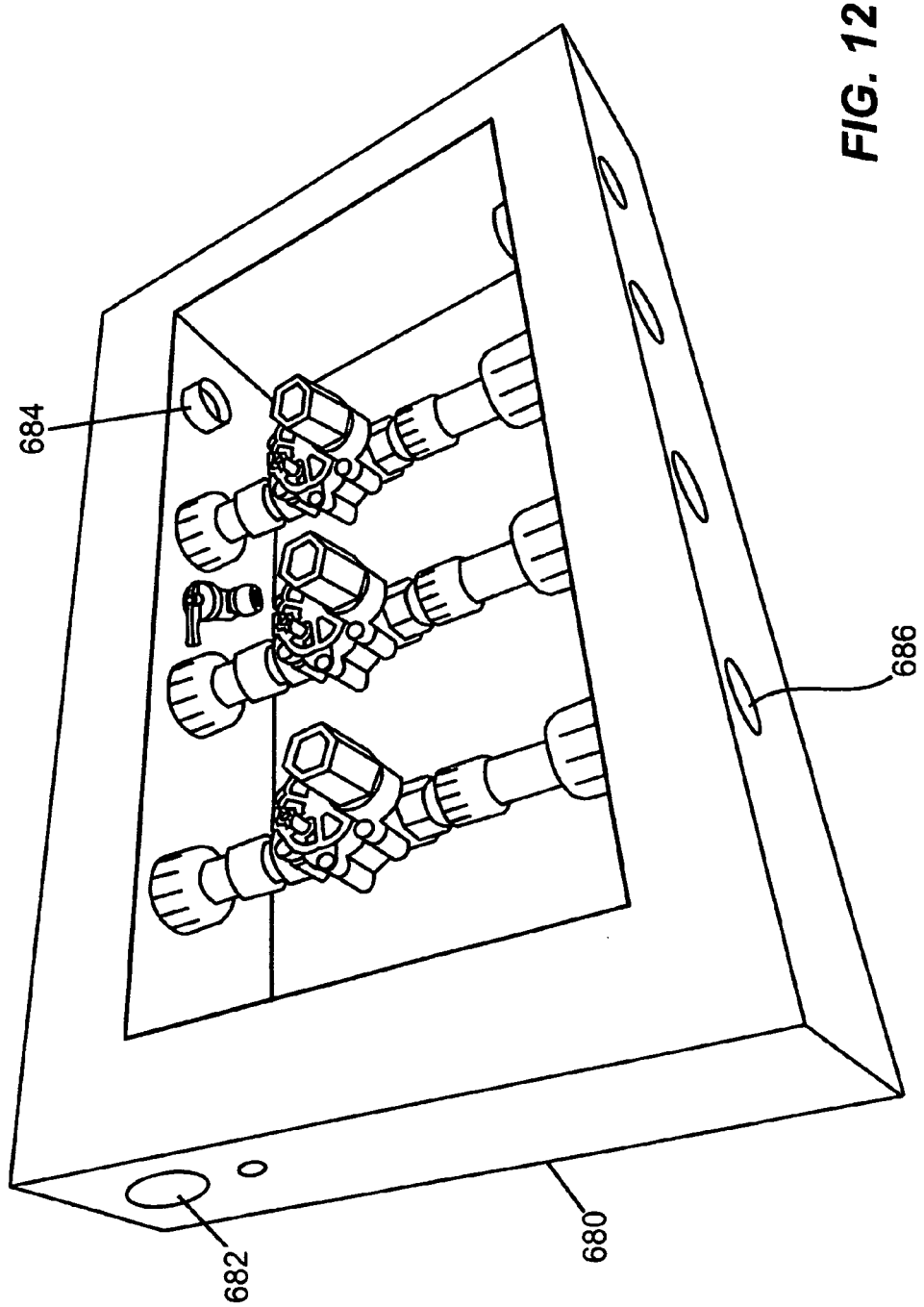
FIG. 12 is a perspective view of the base frame of an alternative embodiment of the present invention having a plurality of irrigation valves installed therein.

Directing attention to FIG. 12, a plurality of irrigation valves are shown disposed within base frame 680 between inlet apertures 684 and outlet apertures 686. It is contemplated that these valves are controlled electronically, and function in accordance with the devices described above in FIGS. 10-11. In this manner, water flows through inlet 682, through inlet apertures 684, through the valves, and out outlet apertures 686. Individual water lines are attached to outlet apertures 686 to distribute water where desired.

Figure 13:
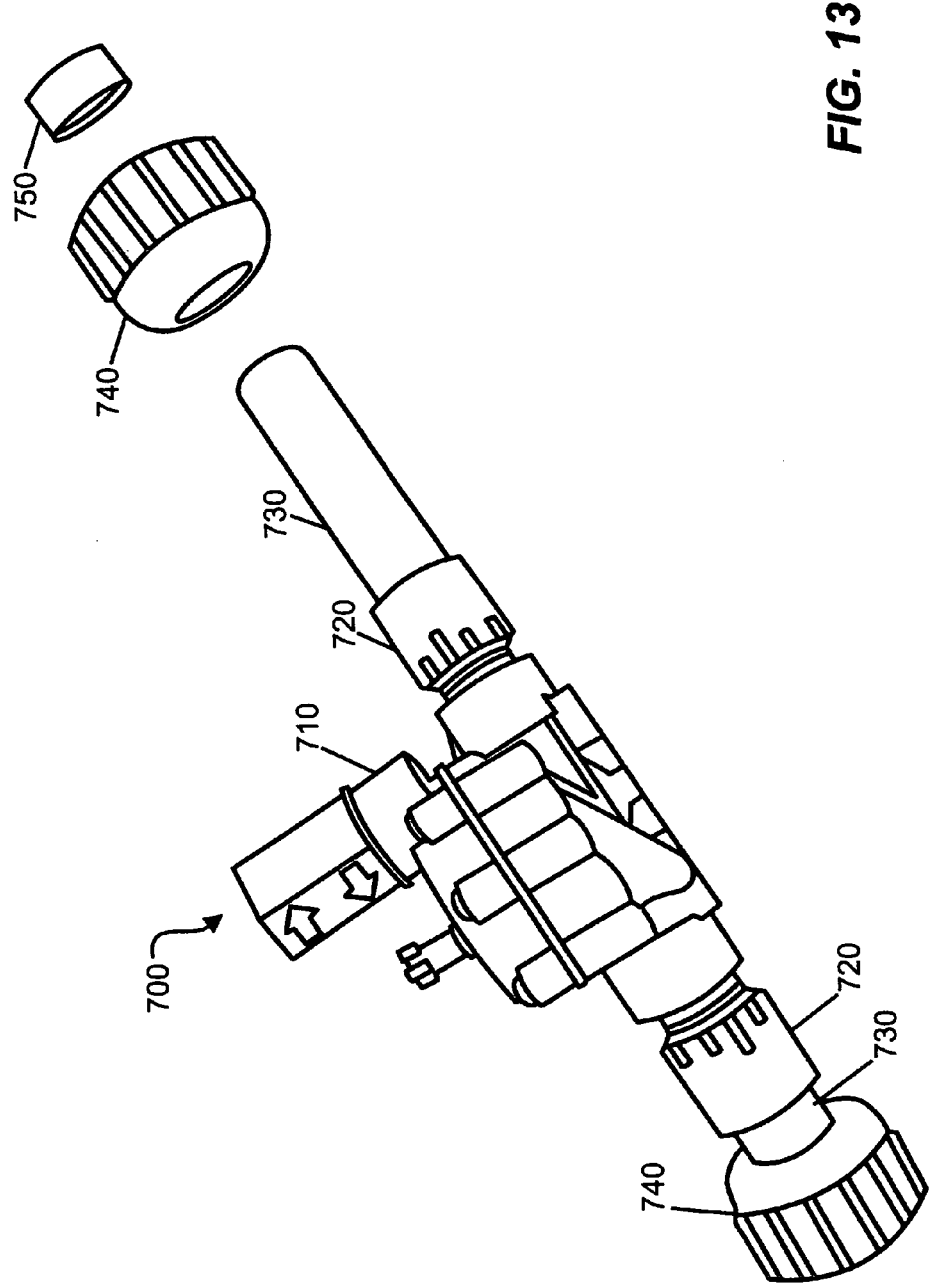
FIG. 13 is a perspective view of an irrigation valve assembly used in embodiments of the present invention.

In the preferred embodiment, the valves shown in FIG. 12 are similar to valve assembly 700 shown in FIG. 13. Valve assembly 700 includes valve body 710, coupling 720 fitted on pipe segment 730, attachment nut 740 that secures waterproof elastomeric cylindrical fitting 750, which fits tightly around the outer surface of pipe segment 730, to a threaded connection, typically protruding from inlet apertures 684 and outlet apertures 686. Through the use of fittings 740 and elastomeric fitting 750, valve assembly 700 is easily removed from base frame 680 without having to cut and glue PVC pipe, as is typically performed in the repair of a failed valve. As vault 600 is typically located below ground, the use of quick release valve assembly 700 within base frame 680 is a vast improvement over traditional glued irrigation valve manifolds.

Figure 14:
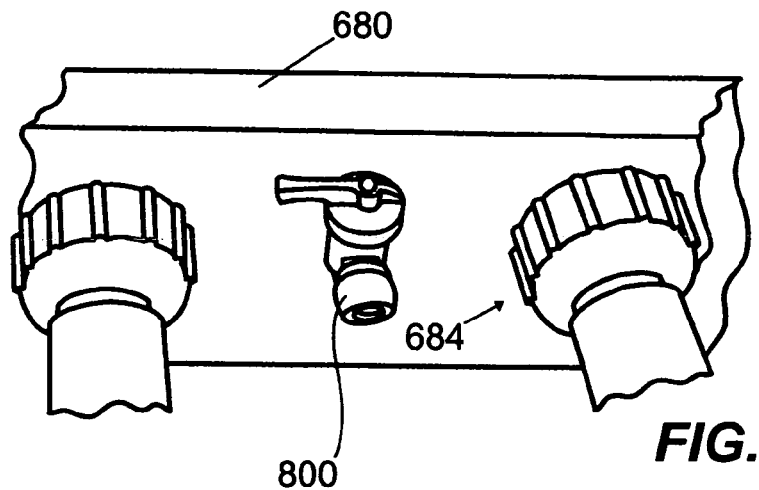
FIG. 14 is a partial perspective view of the base frame of an alternative embodiment of the present invention.

Directing attention to FIG. 14, in an embodiment, valve 800 is provided to release water present in inlet 682 or the upstream side of valve assembly 700.

Figure 15:
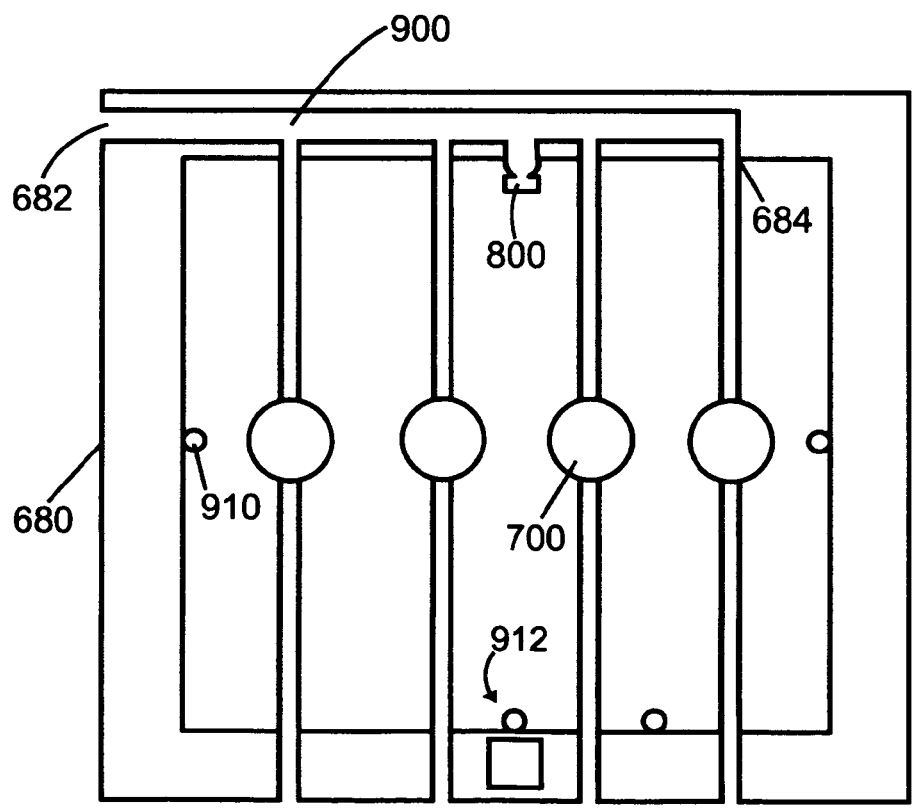
FIG. 15 is a schematic showing water passageways through the base frame of an alternative embodiment of the present invention.

FIG. 15 shows the path of water through inlet 682, through feeder pipe 900, through valve assembly 700, and out of base frame 680. In an embodiment, cylindrical stake guides 910 are provided so that metal stakes can be inserted into the ground beneath base frame 700, to secure base frame 680 on the ground and to provide a grounding source for electronic current passed through the various electronic devices used within vault 600. Optionally, two-wire decoder 912 can be incorporated with base frame 680. Two-wire decoder 912 serves as a multiplexer between a plurality of valves 700 and controller 656, relaying signals to controller 656 that are specific to individual valves.

While numerous modifications can be made to the various embodiments of the present invention, the above description and illustrations should not be construed as limiting the scope of the invention, which is defined by the appended claims.

What is claimed is:

1. An irrigation system valve manifold vault, comprising:
    (A) a base frame member, the base frame member having a plurality of sides defining an enclosed area, the plurality of sides including a first side and a second side, the second side being located apart and opposite from the first side with the enclosed area located between the first and second sides;
    (B) a water inlet passage, the water inlet passage having a feeder pipe and a plurality of inlet apertures that continuously connects to the feeder pipe along a length of the feeder pipe, the plurality of inlet apertures being located on the first side and within the enclosed area, the feeder pipe being encapsulated within an interior of the first side in a manner that has the feeder pipe running parallel to a length of the first side to allow the feeder pipe to continuously connect to an outside of the base frame member at a side other than the first side;
    (C) a plurality of outlet apertures, the plurality of outlet apertures located on the second side, the plurality of outlet apertures extending from the enclosed area to connection points for water lines located on an outside of the second side;
    (D) a plurality of valves, the plurality of valves located within the enclosed area, each valve connecting to its respective outlet aperture and its respective inlet aperture;
    (E) a compartment, the compartment having a top aperture and a bottom aperture, the bottom aperture located upon the base frame member to extend the enclosed area within the compartment; and
    (F) a lid, the lid to cover the top aperture and limit access to the enclosed area.

2. The irrigation system valve manifold vault of claim 1 wherein the valves are connected to their respective inlet apertures and respective outlet apertures by quick release connections.

3. The irrigation system valve manifold vault of claim 2 further comprising of a drain that is anchored into the first side and further connects to the feeder pipe to allow the feeder pipe to drain into the enclosed space.

4. The irrigation system valve manifold vault of claim 1 further comprising a grate that attaches to the base frame member to form an exterior wall of the valve manifold vault upon which the valve manifold vault rests when placed upon or in the ground.

5. The irrigation system valve manifold vault of claim 1 further comprising of a drain that anchors to the first side and further connects to the feeder pipe to allow the feeder pipe to drain into the enclosed space.

6. The irrigation system valve manifold vault of claim 1 wherein the compartment further comprises of a battery for powering one or more electrical devices that control the valves operation.

7. The irrigation system valve manifold vault of claim 6 wherein the lid further comprises of a solar panel for charging the battery and an electrical contact that provides an electrical connection between solar panel and battery when the lid is in the closed position and breaks the electrical connection between the solar panel and the battery when the lid opened.

8. The irrigation system valve manifold vault of claim 6 wherein the one or more electrical devices is one or more electrical devices from a list of electrical devices consisting of a clock, a thermometer, a valve controller, a communication controller, a heating element, a light bulb, a LED display.

9. The irrigation system valve manifold vault of claim 1 wherein the lid has a rectangular framed edge on its underside, the framed edge having a rear portion, the rear portion having a sloped profile that movably engages an edge of the top aperture of the compartment to allow the lid to rotate backward into the open position.

10. The irrigation system valve manifold vault of claim 1 further comprising at least one stake guide, the stake guide including a cylindrical member through which a stake is inserted to pass into the ground to secure the irrigation system valve manifold vault to the ground.

11. An irrigation system valve manifold vault, comprising:
(A) a base frame member, the base frame member having a plurality of sides defining an enclosed area, the plurality of sides including at least a first side and a second side, the second side is placed apart from and opposite to the first side with the enclosed area located between the first and second sides;
(B) a water inlet passage, the water inlet passage having a feeder pipe and a plurality of inlet apertures that continuously connects to the feeder pipe along a length of the feeder pipe, the plurality of inlet apertures being located on the first side and within the enclosed area, the feeder pipe being encapsulated within an interior of the first side in a manner that has the feeder pipe running parallel to a length of the first side to allow the feeder pipe to continuously connect to an outside of the base frame member at a side other than the first side;
(C) a plurality of outlet apertures, the plurality of outlet apertures located on the second side, the plurality of outlet apertures extending from the enclosed area to connection points for water lines located on an outside of the second side;
(D) a compartment, the compartment having a top aperture and a bottom aperture, the bottom aperture located upon the base frame to extend the enclosed area within the compartment; and
(E) a lid, the lid to cover the top aperture and limit access to the enclosed area.

12. The irrigation system valve manifold vault of claim 11 further comprising of a plurality of valves, the plurality of valves are located within the enclosed area, each valve connecting to its respective outlet aperture and respective inlet aperture.

13. The irrigation system valve manifold vault of claim 12 wherein the valves are connected to their respective inlet and outlet apertures by quick release connections.

14. The irrigation system valve manifold vault of claim 11 further comprising a grate that attaches to the base frame member to form an exterior wall of the valve manifold vault upon which the valve manifold vault rests when placed upon or in the ground.

15. The irrigation system valve manifold vault of claim 14 wherein the grate does not touch or support a plurality of valves located within the enclosed area, each valve connecting to its respective outlet aperture and respective inlet aperture.

16. The irrigation system valve manifold vault of claim 11, wherein the lid having a rectangular framed edge on the lid's underside, the framed edge having a rear portion, the rear portion having a sloped profile that movably engages an edge of the top aperture of compartment to allow the lid to rotate backward into an open position.

17. A combination of an irrigation system valve manifold vault and an irrigation system, comprising:
(A) an irrigation system valve manifold vault having a base frame member, a water inlet passage; a plurality of outlet apertures, a set of valves and a compartment;
(B) the base frame member having a plurality of sides defining an enclosed area, the plurality of sides including a first side and a second side, the second side is place apart from and opposite to the first side with the enclosed area located between the first and second sides;
(C) a water inlet passage, the water inlet passage having a feeder pipe and a plurality of inlet apertures that continuously connects to the feeder pipe along a length of the feeder pipe, the plurality of inlet apertures being further located on the first side and within the enclosed area, the feeder pipe being encapsulated within an interior of the first side in a manner that has the feeder pipe running parallel to a length of the first side to allow the feeder pipe to continuously connect to an outside of the base frame member at a side other than the first side;
(D) the plurality of outlet apertures are located on the second side to extend from the enclosed area to connection points for a plurality of irrigation pipes located on the outside of the second side;
(E) a plurality of valves, the plurality of valves located within the enclosed area, each valve connecting to its respective outlet aperture and its respective inlet aperture;
(F) an irrigation system comprising at least of a water supply pipe and a plurality of irrigation pipes, the water supply pipe connects to the feeder pipe to supply water to feeder pipe; and
(G) the plurality of irrigation pipes continuously connected to respective outlet apertures to direct water away from the irrigation system valve manifold vault.

18. The combination of claim 17 wherein the valves are connected to their respective inlet and outlet apertures by quick release connections.

19. The combination of claim 17 further comprising a grate attached to base frame member to form an exterior wall of the valve manifold vault that the valve manifold vault rests upon when the valve manifold vault is placed proximate to the ground.

20. The combination of claim 17 wherein the compartment further having a top aperture and a bottom aperture, the bottom aperture located upon the base frame to extend the enclosed area within the compartment, the top aperture allowing access to the enclosed area, the compartment further being sloped to allow dirt to press down upon the compartment to hold it in place upon the base frame member.

21. The combination of claim 20 further comprising a lid having a rectangular framed edge on the lid's underside, the framed edge having a rear portion, the rear portion having a sloped profile that movably engages the top aperture of compartment to allow lid to rotate backward over a top of the compartment into the open position.

* * * * *